J. F. BLY.
SEED PLANTER.
APPLICATION FILED JUNE 21, 1910.
991,940.
Patented May 9, 1911.
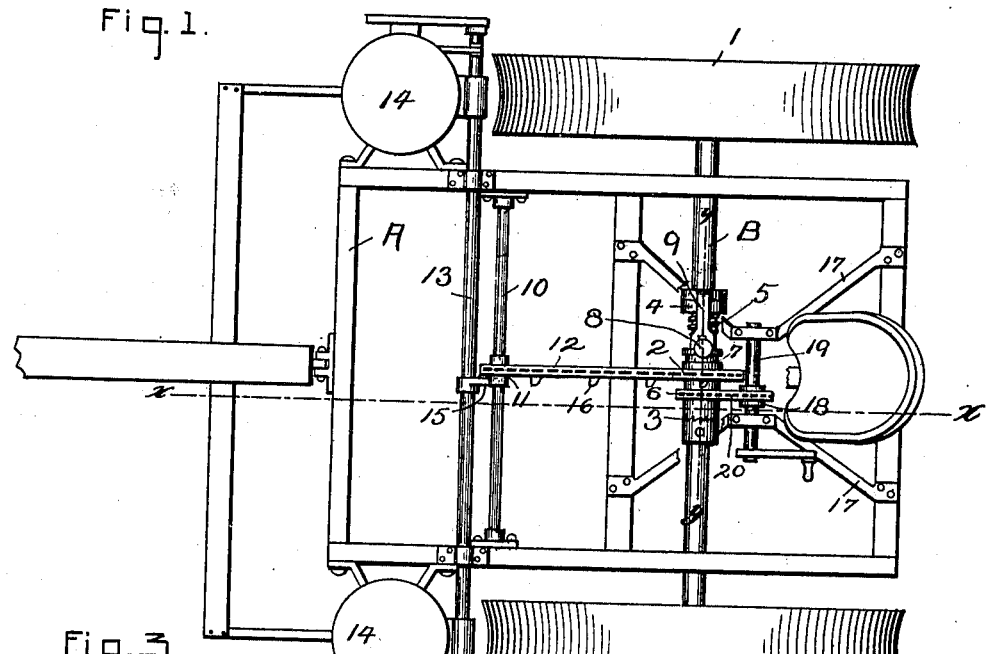
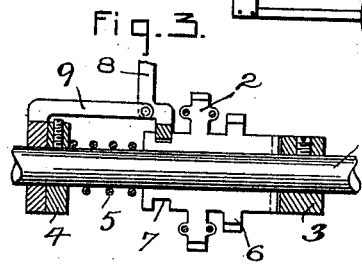
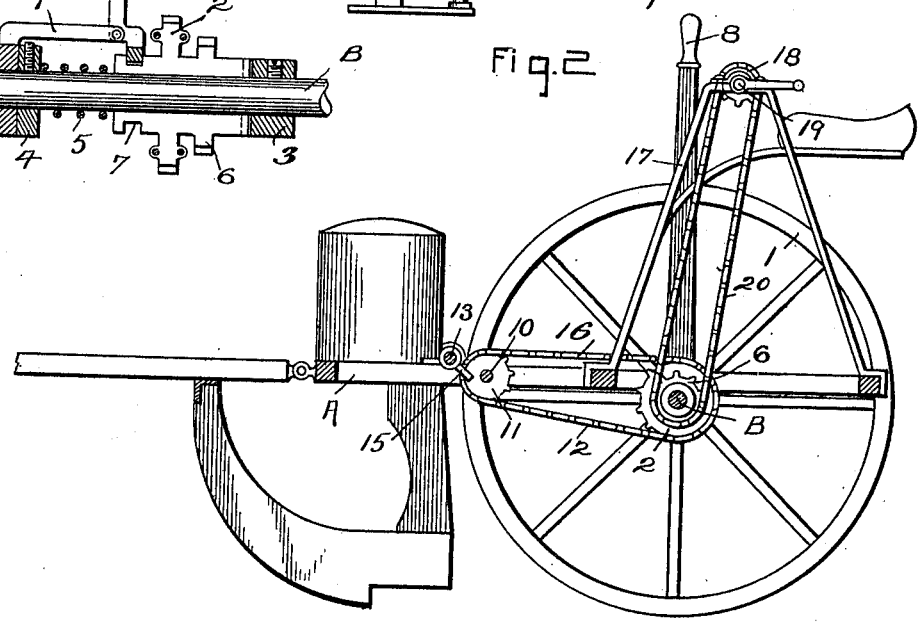
Witnesses
W. Ray Taylor.
Elsie P. White
Inventor
John F. Bly
By Louis Boggle &Co
his Attorneys
THE NORRIS PETERS CO., WASHINGTON, D. C.

UNITED STATES PATENT OFFICE.

JOHN FREDRICK BLY, OF SPRING GROVE, ILLINOIS.

SEED-PLANTER.

991,940.

Specification of Letters Patent. Patented May 9, 1911.

Application filed June 21, 1910. Serial No. 568,205.

*To all whom it may concern:*

Be it known that I, JOHN F. BLY, a citizen of the United States, residing at Spring Grove, in the county of McHenry and State of Illinois, have invented certain new and useful Improvements in Seed-Planters, of which the following is a specification.

My invention relates to an improvement in corn planters, and the object is to provide means for controlling the discharge from the hoppers whereby the corn will be delivered at predetermined intervals for planting the corn in hills.

A further object is in the provision of means for adjusting the parts whereby the hills can all be arranged in alinement—that is, after the planter has traveled across the field, and is returning, it is desired to have the corn planted in hills on a direct line with those planted in the row completed, and my invention provides means whereby this result can be accomplished.

The invention consists in certain novel features of construction and combinations of parts which will be hereinafter fully described and pointed out in the claims.

In the accompanying drawings:—Figure 1 is a top plan view; Fig. 2 is a longitudinal vertical sectional view on the line $x-x$ of Fig. 1; and Fig. 3 is a sectional detail view on the line $y-y$ of Fig. 1, showing the clutch mechanism.

A represents the frame, B the axle, and 1, 1, are the wheels, in the hubs of which the ends of the axle are secured. A sprocket wheel 2 is loosely mounted upon the axle B and is adapted to be thrown and held in engagement with the clutch member 3. A collar 4, mounted upon the axle; and a spring 5 interposed between the collar and the sprocket wheel normally holds the sprocket wheel in engagement with the clutch member 3. Integral with the hub of the sprocket wheel is a sprocket wheel 6. The hub of the sprocket wheel 2 is provided with an annular groove 7, in which the forked end of the lever 8 is received, whereby the sprocket wheel 2 can be shifted in and out of engagement with the clutch member 3, the lever 8 being supported upon an arm or bar 9, which is mounted upon the collar 4.

A shaft 10 is mounted upon the frame, and is provided with a sprocket wheel 11, over which the sprocket chain 12 travels to the sprocket wheel 2 by which the chain is driven.

A rocker shaft 13 is mounted upon the frame, and is adapted to control the seed feeding mechanism in the seed boxes 14.
The construction of the dropping mechanism, which is contained in the seed boxes, has not been shown, as any approved form can be used. An arm 15 is mounted upon the rocker shaft, and is adapted to be engaged by the spurs 16 on the chain 12, for oscillating the rocker shaft to cause the dropping mechanism of the seed boxes to be operated.

Braces 17 are connected to the frame, and mounted between the braces is a sprocket wheel 18, mounted upon a crank shaft 19. A sprocket chain 20 passes over the sprocket wheel 18, and the sprocket wheel 6. To insure the proper alinement of hills, the lever 8 is operated to disengage the clutch, and by turning the crank shaft 19, the sprocket wheel 6 will be rotated, to reverse the direction of movement of the chain 12, causing the spur 16 nearest the arm 15 to be drawn rearward to prevent it from coming in contact with the arm 15 on the rocker shaft. When the spur has been drawn back sufficiently far, the lever is released, allowing the sprocket wheel to return to its original engagement with the clutch member, whereby the forward movement of the chain 12 will cause the spur to come in contact with the arm 15 to cause the dropping of the seed at the proper time. If it is seen that the grain will not be dropped at the proper time, the chain 12 can be advanced instead of reversed, as above described.

It is evident that more or less slight changes might be resorted to in the form and arrangement of the several parts described, without departing from the spirit and scope of my invention, and hence I do not care to be limited to the exact structure herein set forth, but:—
Having fully described my invention, what I claim as new and desire to secure by Letters Patent, is:—

1. In a seed planter, the combination with a frame having an axle mounted thereon, wheels mounted upon the axle for causing the axle to be rotated, of a sprocket wheel mounted upon the axle, means for locking the sprocket wheel upon the axle, a shaft having a sprocket wheel thereon, a dropping mechanism, a sprocket chain passing over the sprocket wheels on the axle and shaft, means on the chain for intermittently operating the dropping mechanism, a pinion connected to the sprocket wheel on the axle, braces on the frame, a sprocket wheel mounted between the braces, a chain connecting the pinion and sprocket wheel, means for drawing the sprocket wheel on the axle out of engagement, and means for operating the last named sprocket chain for causing the first named sprocket chain to be moved.

2. In a seed planter, the combination with a frame having an axle rotatably mounted thereon, wheels mounted upon the axle, of a dropping mechanism, a sprocket wheel mounted upon the axle, a sprocket chain driven by the sprocket wheel for operating the dropping mechanism, means for releasing the sprocket wheel from rotation with the axle, a sprocket wheel mounted upon the frame, a chain connecting said last named sprocket wheel with the first named sprocket wheel, and means for operating the last named sprocket wheel for causing a reverse movement of the first named sprocket chain.

3. In a seed planter, the combination with seed hoppers, a rocker-shaft for controlling the discharge from the hoppers, said shaft having an arm thereon, of an axle, a sprocket wheel loosely mounted thereon, means for clutching the sprocket wheel to the axle, a rotary shaft having a sprocket wheel thereon, and a sprocket chain extending over said sprocket wheels, and having spurs thereon in position to engage the arm on the rocker shaft whereby to actuate the latter and control the discharge from the hopper.

4. In a seed planter, the combination with seed hoppers, a rotary shaft for controlling the discharge therefrom, said rotary shaft carrying an arm, of an axle, two integral sprocket wheels loosely mounted on the axle, a clutch mechanism for locking said wheels to the axle, means for clutching and unclutching said sprocket wheels, two rotary shafts each having a sprocket wheel thereon, sprocket chains extending from the sprocket wheels on the axle over the sprocket wheels on the shafts, one of said chains having spurs thereon in position to intermittently engage the arm on the rocker shaft whereby to control the discharge of grain from the hoppers, and the other shaft capable of being manually turned when the two sprocket wheels on the axle are unclutched from the axle whereby to rearrange the parts to regulate the period of discharge from the hoppers.

In testimony whereof I affix my signature, in the presence of two witnesses.

JOHN FREDRICK BLY.

Witnesses:
ANTON SCHAEFER,
JAMES PIERCE.